April 13, 1948. M. M. CUNNINGHAM 2,439,562
FUEL TANK
Filed April 1, 1944
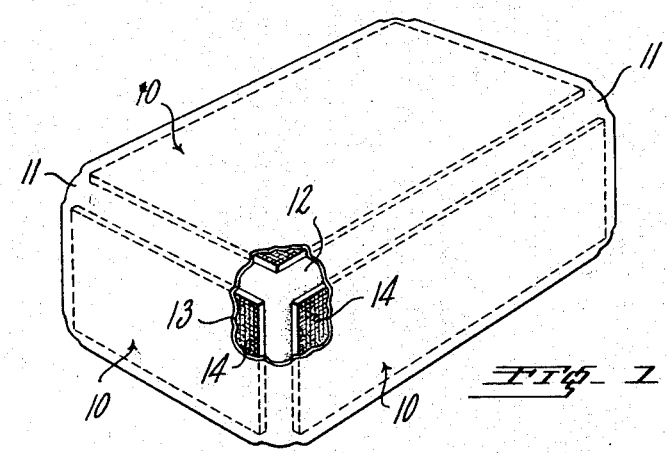
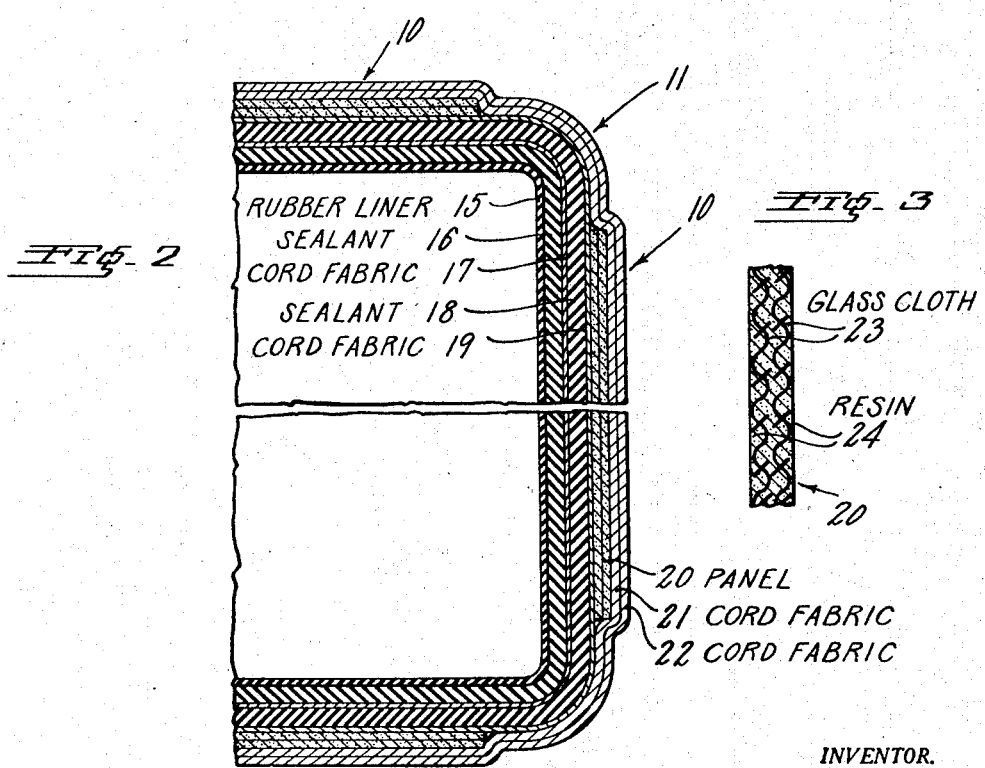
INVENTOR.
MARION M. CUNNINGHAM
BY Lester J. Bradley
ATTORNEY Patented Apr. 13, 1948

2,439,562

UNITED STATES PATENT OFFICE 2,439,562

FUEL TANK

Marion M. Cunningham, South Bend, Ind., assignor to United States Rubber Company, New York, N. Y., a corporation of New Jersey Application April 1, 1944, Serial No. 529,157

2 Claims. (Cl. 154—43.5)

This invention relates to puncture sealing fuel tanks constructed so that holes formed therein by bullets or other projectiles will close immediately to prevent the escape of fuel.

Fuel tanks, such as puncture sealing fuel tanks for airplanes are usually built accurately to size but so that they will tightly fit in a cavity in an airplane, the inner dimensions of which cavity are usually slightly less than the corresponding outer dimensions of the fuel tanks. It has, therefore, been customary heretofore to make these puncture sealing fuel tanks with semi-flexible walls so that a tank may be partially collapsed to facilitate its insertion in such cavity.

It has been proposed heretofore to improve the puncture sealing properties of a fuel tank by introducing between the semi-flexible walls of such tank and the adjacent metal walls such as the aluminum skin of the airplane, a specially constructed panel formed of extremely strong and tough sheet material which is stiff. These panels when introduced between the semi-flexible sidewalls of the fuel tank and the adjacent surrounding metal walls such as the aluminum skin of the airplane serve to prevent the metal around a hole produced by a projectile as it enters the tank from being displaced laterally inwardly in the form of ragged projections that may extend into the aligned hole formed in the tank by the projectile and prevent such hole from closing. Such panel also serves to lessen the displacement of a tank wall outwardly by the projectile or the hydraulic pressure it exerts upon the tank fuel as the projectile forces an exit hole through the tank wall. The construction and use of such protecting panels are more fully disclosed in the Hoover application, Serial No. 483,457, filed April 17, 1943, now United States Patent No. 2,429,688, for Fuel tanks, which application discloses that the stiff protecting panels are cut accurately to the size of the walls of the tank receiving cavity and are placed in the cavity against the metal walls before the tank is introduced into the cavity.

The present invention contemplates a novel construction whereby such stiff protecting panels can be secured directly in the walls of the puncture sealing fuel tank, and whereby the tank may still be partially collapsed to facilitate its insertion in the tank receiving cavity of the airplane, which cavity as above stated is usually slightly smaller than the outside dimensions of the tank.

The primary feature of the present invention resides in a puncture sealing fuel tank having stiff walls made stiff by such panels and flexible marginal edge portions where the walls join one another so that the edges form a hinge-like flexible connection between the stiff walls. Such a construction is provided by forming a fuel tank with walls of a puncture sealing layer of material about which there is provided a protecting and re-inforcing layer of textile material such as cord fabric, and the tough stiff panel that improves the puncture sealing properties of the fuel tank is introduced between the puncture sealing layer and said reinforcing layer. The panel, in accordance with the present invention, is made somewhat smaller in area than the tank walls formed by the layers between which the panel is introduced, so that it terminates at the respective edges at the approximate points where the radii of the rounded edges which connect the walls start. As a result of this construction a hinge-like flexible connection is provided between the stiff tank walls, and the paneled walls can be forced inwardly or collapsed somewhat so that the tank may be introduced into a slightly smaller cavity.

By employing the construction of the present invention the stiff tough protecting panels are built into the sidewalls of the tank as an integral structure and are maintained in proper relation with the puncture sealing layer of the tank walls. Furthermore this construction facilitates the installation of the tank in the cavity of an airplane since the panels do not have to be placed separately in such cavity as in the construction of the above-mentioned Hoover application where the panels are placed in the cavity prior to the introduction of the fuel tank.

The requirements of the stiff tough protecting panel are exacting to a high degree, since it should not tear or shatter when struck by a projectile and the projectile when passing therethrough should make a clean cut hole no larger than the projectile, and the panel should possess these properties throughout a temperature range from approximately 120° F. above zero to approximately 50° F. below zero. Also when a projectile enters a fuel tank this panel should supply sufficient support for the adjacent metal wall to prevent the torn ragged metal around the hole from being bent laterally, which is known as flowering, and from extending into the aligned hole formed by the projectile in the tank. When the projectile leaves the tank the panel is required to perform a different function, in that it should now support the tank wall so as to lessen the tendency of the same to be bulged outwardly under the force of the projectile and the hydraulic bulging force which the confined liquid exerts upon the tank walls under the influence of the projectile.

The above and other features of the present invention will be more fully understood from the following description when read in connection with the accompanying drawing, wherein Fig. 1 is a perspective view of a fuel tank constructed in accordance with the present invention;

Fig. 2 on a larger scale is a vertical sectional view through a more elaborate tank construction than that shown in Fig. 1; and Fig. 3 is a sectional view of the stiff tough panel to be described.

The present invention may be used in constructing tanks for gasoline or other fuel, or for oil tanks and may be employed in tanks of various sizes and shapes. The tank shown in Fig. 1 of the drawing is substantially rectangular in shape and has the stiffened parallel walls 10 disposed at right angles to each other and these walls are connected by the rounded edges 11 which are more flexible than the stiffened walls 10.

In carrying out the present invention all six walls of the tank or if desired fewer than all six walls may have the stiff, tough panels herein contemplated associated therewith. The tank shown in Fig. 1 is formed largely of a puncture sealing inner layer 12. This layer 12 may be formed of natural or synthetic rubber which preferably is unvulcanized and the inner face of this layer is provided with a protecting coating of synthetic rubber that is capable of resisting the action of the tank contents. At the outer face of the sealant layer 12 is provided a protecting and reinforcing layer 13 of strong textile material, such for example as cord fabric, and between these layers 12 and 13 is provided the stiff, tough panel 14 which panel, as above stated, is somewhat smaller in area than the corresponding wall formed of the layer 12. The construction is preferably such that the edges of the panel 14 terminate at approximately the starting point of the respective radii of the spherical surfaces forming the rounded edges 11 as shown in Fig. 1. As a result of this construction the walls 10 of the receptacle will be quite stiff throughout the area thereof occupied by the panel 14 but will be relatively flexible in the rounded edge portions 11 where the panel does not extend, whereby the edges 11 form a hinge-like flexible connection between the much stiffer side walls 10.

The construction is such that as soon as a projectile pierces the sealant and permits the gasoline or the like to reach the unvulcanized rubber this rubber will expand to fill the hole. Also when the projectile passes from the metal wall surrounding the tank into the tank the panel 14 will prevent the metal around the projectile hole from flowering and entering the aligned hole in the tank where it would prevent the sealant from closing the hole in the layer 12. Furthermore the panel due to its stiff but resilient properties will yield outwardly momentarily as a projectile passes outwardly therethrough but will immediately force the tank wall back to its planar condition so that the sealant will more effectively close the projectile hole.

Each of the layers 12, 13, and 14 may be replaced by a more elaborate ply construction as shown in the modification of Fig. 2, and wherein 15 is a lining of synthetic rubber which is not affected by the solvent action of the fuel such as gasoline confined in the tank. 16 is a layer of sealant rubber such as unvulcanized synthetic rubber and the layers 15 and 16 are preferably separated by a film of nylon which is applied in cement form and the nylon film bonded to layers 15 and 16 by cement. The nylon is for the purpose of improving a fuel diffusion resistance through rubber liner 15. 17 is a strengthening and reinforcing layer of tire cord. 18 is a second layer of sealant rubber similar to 16, and 19 is a second reinforcing layer of tire cord. 20 is a panel of tough, stiff protecting material and corresponds to the panel 14 of Fig. 1. The layers just described are adhesively secured together and the entire structure is preferably enclosed by the protecting and reinforcing layers 21 and 22 of tire cord.

The panels 14 and 20 may be constructed as described in the abovementioned Hoover application. The panel 20 as shown in Fig. 3 of the present drawing is formed of two extremely strong sheets 23 of woven glass fabric which sheets are bonded together and impregnated with a synthetic resin 24.

The resin 24 is preferably a synthetic inert thermosetting resin such for example as Laminac P4122 which is described in the above mentioned Hoover application as believed to be a mixture of alkyd resin and a polymerizable olefin (styrene), and is also described on page 137 of "Plastics Catalog, the 1944 Encyclopedia of Plastics," published by Plastic Catalogue Corporation, 122 E. 42nd Street, New York, N. Y.

When the stiff tough panel 14 or 20 is embodied in the wall of the tank as herein contemplated the panel is maintained in contacting relation with the inner and outer walls of the tank in proper position to improve the puncture sealing action, and this construction makes unnecessary the work of lining the walls of the cavity which is to receive the tank before such tank is placed in the cavity.

Having thus described my invention, what I claim and desire to protect by Letters Patent is:

1. A selfsealing, non-metallic fuel tank for use in airplanes in close proximity to the metal walls of the airplane, said tank having stiff walls and rounded flexible marginal edge portions where the walls join one another, each wall being formed of a puncture sealing layer and an outer protecting and reinforcing layer of textile material and having secured between and in contact with these layers a resilient shatter-resistant panel of stiff, tough, high tensile, resin-impregnated woven material through which a projectile will cut a clean hole and which panel is hard enough to prevent the metal of a near wall from flowering under the impact of the projectile through the panel into the wound of the puncture sealing layer, said panel being somewhat smaller in area than the layers between which it is secured, whereby a paneled wall can be forced bodily inwardly to reduce the size of the tank by bending the less rigid marginal edge portions.

2. A selfsealing, non-metallic fuel tank for use in airplanes in close proximity to the metal walls of the airplane, said tank having stiff walls and rounded flexible marginal edge portions where the walls join one another, each wall being formed of a puncture sealing layer and an outer protecting and reinforcing layer of textile material and having secured between and in contact with these layers a resilient shatter-resistant panel of stiff, tough, high tensile material formed of woven glass cloth impregnated with a synthetic resin and through which a projectile will cut a clean hole and which panel is hard enough to prevent the metal of a near wall from flowering under the impact of the projectile through the panel into the wound of the puncture sealing layer, said panel being somewhat smaller in area than the layers between which it is secured, whereby a paneled wall can be forced bodily inwardly to reduce the size of the tank by bending the less rigid marginal edge portions.

MARION M. CUNNINGHAM.

REFERENCES CITED

The following references are of record in the file of this patent:

UNITED STATES PATENTS

| Number | Name | Date |
| --- | --- | --- |
| 1,297,305 | Thacker | Mar. 11, 1919 |
| 1,662,018 | Van Orman | Mar. 18, 1928 |
| 2,354,701 | Pescara | Aug. 1, 1944 |
| 2,374,332 | Crawford | Apr. 24, 1945 |

FOREIGN PATENTS

| Number | Country | Date |
| --- | --- | --- |
| 396,405 | Great Britain | Aug. 2, 1933 |